United States Patent [19]

Toru et al.

[11] Patent Number: 5,259,350

[45] Date of Patent: Nov. 9, 1993

[54] FUEL INJECTION DEVICE

[75] Inventors: Kawatani Toru, Kawasaki; Hiroshi Kamikubo, Yokohama; Katsuyuki Sugawara, Tokyo; Kazutoshi Mori, Yokohama, all of Japan

[73] Assignee: Mitsubishi Jidosha Kogyo Kabushiki Kaisha, Tokyo, Japan

[21] Appl. No.: 760,017

[22] Filed: Sep. 13, 1991

[30] Foreign Application Priority Data

Sep. 13, 1990 [JP] Japan ............... 2-95534[U]

[51] Int. Cl.$^5$ ............................................. F02M 37/04
[52] U.S. Cl. ............................ 123/501; 123/179.17
[58] Field of Search ................. 123/179.17, 500, 501, 123/502, 503, 357

[56] References Cited

U.S. PATENT DOCUMENTS

| | | | |
|---|---|---|---|
| 3,815,564 | 6/1974 | Soda | 123/501 |
| 4,462,368 | 7/1984 | Funada | 123/501 |
| 4,708,114 | 11/1987 | Gontert | 123/449 |
| 4,711,211 | 12/1987 | Oshizawa | 123/501 |
| 4,727,836 | 3/1988 | Oshizawa | 123/501 |
| 4,736,726 | 4/1988 | Matsuno | 123/501 |
| 4,737,085 | 4/1988 | Gontert | 123/501 |

FOREIGN PATENT DOCUMENTS

| | | |
|---|---|---|
| 20075802 | 4/1983 | European Pat. Off. . |
| 2167814 | 11/1985 | United Kingdom . |
| 1612592A | 2/1986 | United Kingdom . |

*Primary Examiner*—Carl S. Miles

[57] ABSTRACT

The fuel injection device includes a plunger, operatively connected, to a cam driven by an engine, having control groups for use in communicating with an outer circumferential surface and an end surface of a fuel injection nozzle. The fuel injection device further includes a timing sleeve fitted outwardly of the plunger, for opening or closing the control groups and an actuator for driving a timing rod connected to the timing sleeve in such a way as to move the timing sleeve up and down against the plunger. Finally, the fuel injection device includes a control device for outputting a signal for performing moving-up or moving-down of the timing sleeve to the actuator, and inputting a signal from a source of operation information.

17 Claims, 6 Drawing Sheets

Advancing Angle Value ($\Theta_0$)

($N_E$)

Number of Revolution of Engine

FIG. 5

Advancing Angle Added Value $T_W \leq T_3$ $T_W = T_2$ ($\Theta_W$)

$T_W \geq T_1$ (NE)

Number of Revolution of Engine

FUEL INJECTION DEVICE

BACKGROUND OF THE INVENTION

1. Field of the Invention

This invention relates to a fuel injection device.

2. Description of the Related Art

In a diesel engine, fuel is supplied by a fuel injection pump, having the same number of plungers as the number of injection nozzles, for forcibly feeding fuel under the rotation of a cam shaft.

In the event that an operation of the engine is started from a state in which the engine is in a low temperature state, a large amount of unburned fuel is contained in exhaust gas, so as to cause exhaust gas performance to be deteriorated. In this case, a fast setting of an injection time of fuel enables the unburned fuel to be restricted. However, there is no problem if the engine is always kept at its low temperature state. In turn, if the engine is kept at its warm temperature state, starting of the engine from this state may cause a large amount of NOx (x being an integer) to be present in the exhaust gas.

SUMMARY OF THE INVENTION

The present invention has been invented in view of the above situation, and it is an object of the present invention to provide a fuel injection device for a diesel engine in which an injection time for fuel is made variable in compliance with a state of the temperature in the engine.

These and further objects of the present invention will become more readily apparent from the understanding of the preferred embodiments with reference to the drawings.

A configuration of the present invention accomplishing the above object comprises a plunger, operatively connected to a cam, driven by an engine and having control groups for use in communicating with an outer circumferential surface and an end surface of a fuel injection nozzle, a timing sleeve, fitted outwardly of the plunger, for opening or closing the control groups; an actuator for driving a timing rod, connected to the timing sleeve, in such a way as to move the timing sleeve up and down against the plunger; and a control device for outputting a signal, for performing an up moving or a down moving of the timing sleeve, to the actuator and for inputting a signal from a source of operation information. Thereby, the timing sleeve is moved up and down in response to a signal from the source of operating information so as to carry out a control over an advancing angle.

The number of revolutions of the engine is detected by a device for sensing the number of revolutions, a temperature of cooling water is detected by a device for sensing water temperature; an intake gas temperature is detected by a device for detecting a temperature of the intake gas; an amount of the advancing angle is determined by a control device in response to a state of the temperature of cooling water in respect to the number of revolutions; a state of intake gas temperature is determined with respect to the number of revolution and the maximum amount of the advancing angle at a fuel injection time in respect to the number of revolutions, and then the fuel injection device is controlled in response to the amount of the advancing angle.

BRIEF DESCRIPTION OF THE DRAWINGS

The present invention will become more fully understand from the detailed description given herein below and the accompanying drawings which are given by way of illustration only and are not intended to limit the present invention, and wherein.

DESCRIPTION OF THE PREFERRED EMBODIMENTS

Figure 1:
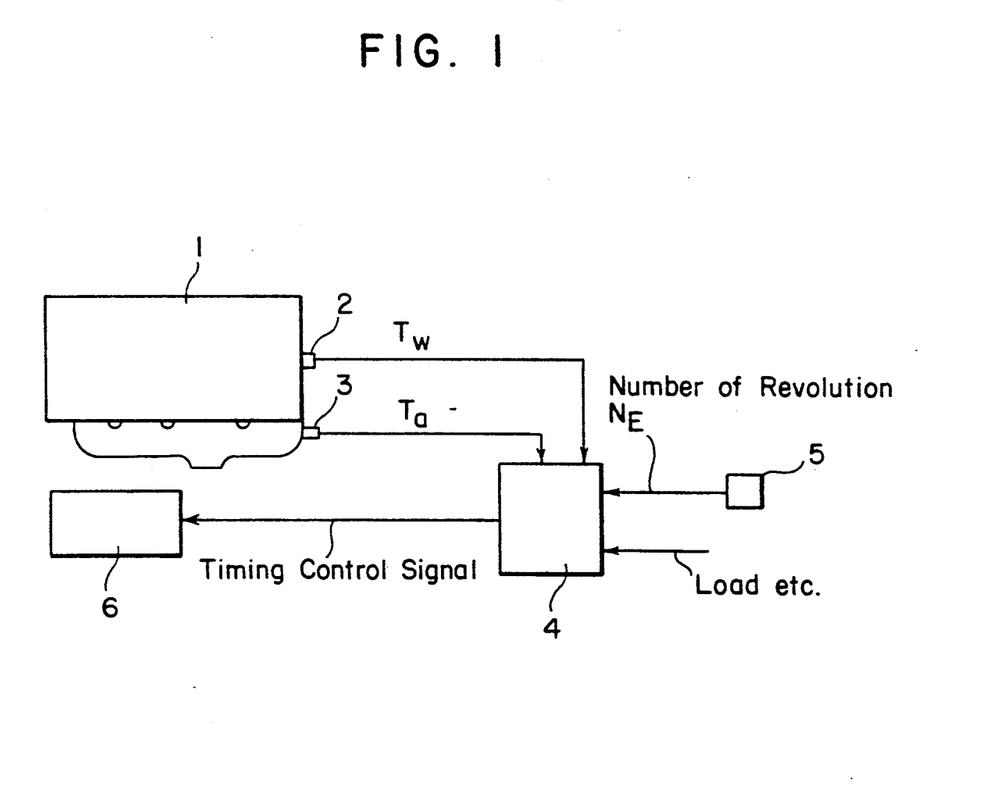
FIG. 1 is a schematic view illustrating a configuration of a fuel injection device of a diesel engine concerning a first preferred embodiment of the present invention.
Figure 2:
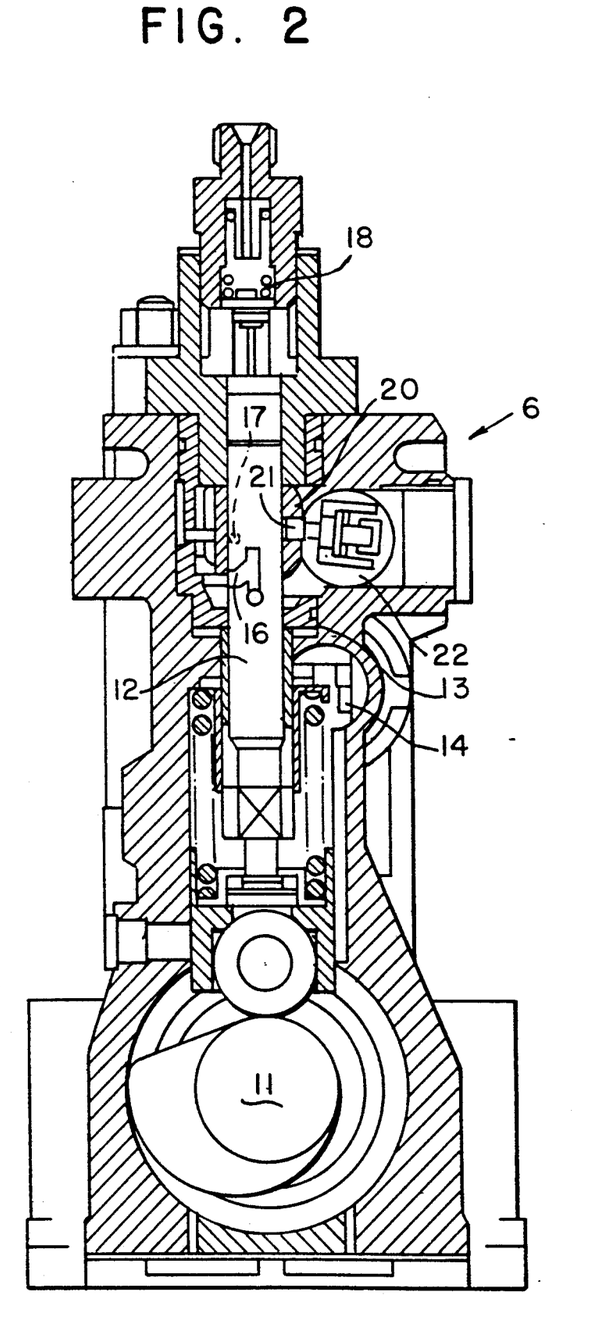
FIG. 2 is a sectional view illustrating a fuel injection pump.

In FIG. 1, a schematic configuration of a fuel injection device for a diesel engine concerning one preferred embodiment of the present invention is shown. In FIG. 2 a sectional view of an example for a fuel injection pump used in the fuel injection device of FIG. 1 is shown an operative illustration of the fuel injection pump is shown.

In FIG. 1, a diesel engine (hereinafter referred to as an engine) 1 is provided with a water temperature sensor 2, which acts as a device for sensing a water temperature so as to detect a temperature of cooling water, and an intake temperature sensor 3, which acts as an intake gas temperature sensor device for use in sensing an intake gas temperature. A cooling water temperature Tw, sensed by a water temperature sensor 2 and an intake gas temperature Ta, sensed by the intake gas temperature sensor 3, are inputted to a control device 4. To the control device 4 are inputted the number of revolutions $N_E$ detected by a number-of-revolution sensor 5, for detecting the number of revolutions of the engine 1 and a load for the engine 1 or the like. The source of operating information includes an intake gas temperature sensing device, a water temperature sensing device and a device for sensing the number of revolutions.

Fuel is forcibly fed from the fuel injection pump 6, of which the forced feeding time is variable, and a forced feeding time of the fuel injection pump 6 is controlled in response to a timing control signal obtained from the control device 4. That is, the fuel injection device illustrated in FIG. 1 is kept at a state in which the fuel injection device is provided with a fuel injection pump of which the fuel injection time is made variable.

The configuration of the fuel injection pump 6 will be described in reference to FIG. 2.

A plunger 12 is moved up and down within a plunger barrel 13 at a specified stroke rate under a rotation of a cam shaft 11, rotated in synchronism with a crank shaft of the engine 1 so as to forcibly feed the fuel to a fuel injection valve (not shown). The adjustment of an amount of injection is carried out by moving a control latch 14 cooperating with an accelerator pedal (not shown) and by rotating a control sleeve 15. That is, a plunger 12, engaged with the control sleeve 15, is also rotated in the piunger barrel 13 under a rotation of the control sleeve 15. Thereby, an aligning position, between the control group is for the plunger 12 and an oil discharging hole (a spill-port) 17 of a timing sleeve 20, is made different and an effective stroke of the plunger 12 is varied, which results in an amount of injection also being varied. Reference numeral 18 in FIG. 2 denotes a delivery valve for use in keeping the fuel pressure constant when the fuel is forcibly fed from the pump. The timing sleeve 20 is engaged with a timing rod 22 through a pin 21, and the timing rod 22 is rotated by a rotary solenoid (not shown). The timing sleeve 20 is moved up and down under a rotation of the timing rod 22 with respect to the plunger 12, and a stroking position (an injection starting time) is varied where the control group 16 of the plunger 12 is closed under a variation in position of the timing sleeve 20.

Figure 3:
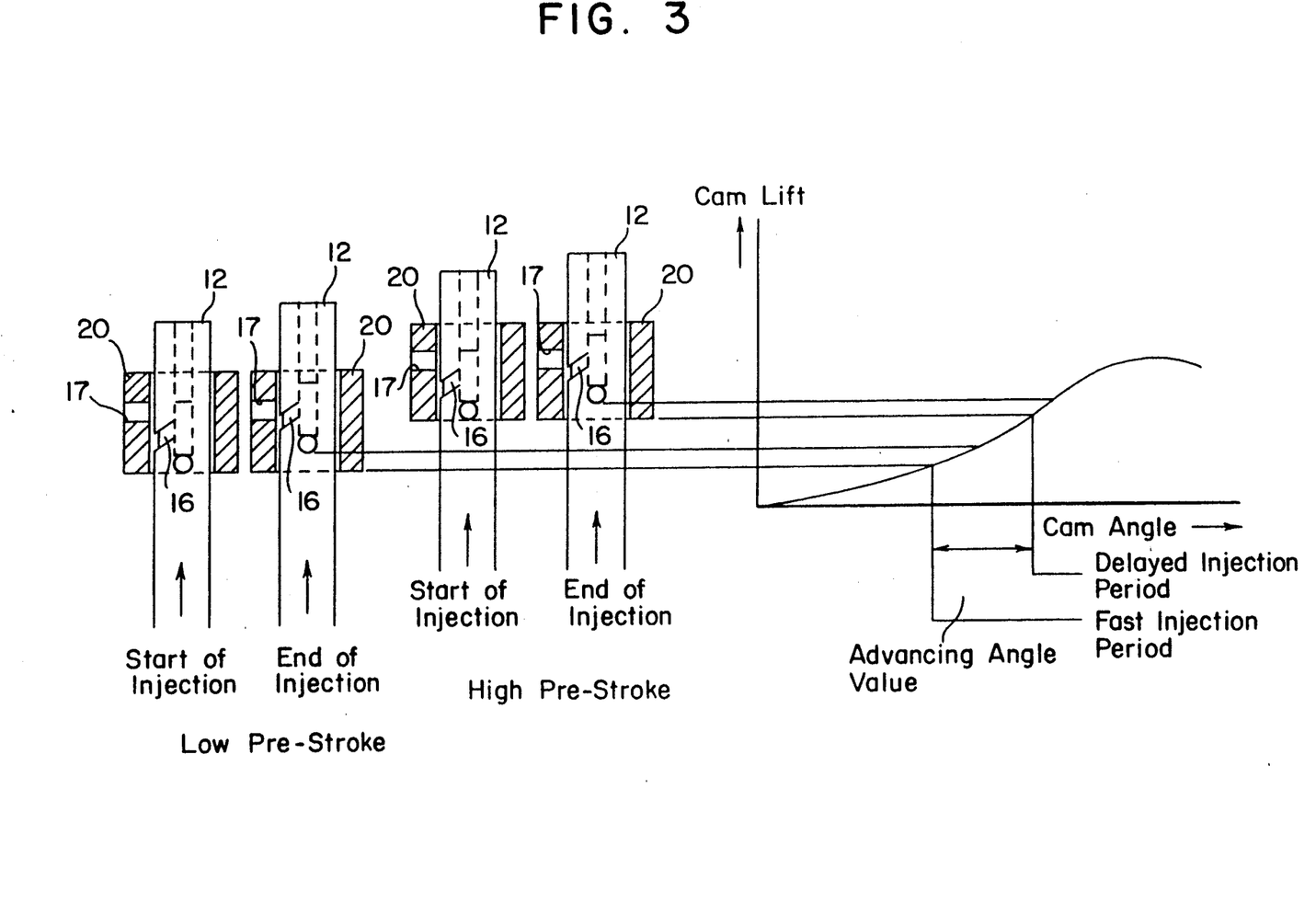
FIGS. 3(a)–(e) are illustrations for showing an operation of a fuel injection pump.

That is, as shown in FIGS. 3(a) and (c), when the timing sleeve 20 is being moved downwardly (with a low pre-stroke), the plunger 12 is placed at a low position, the control group 16 is closed and an injection time is made fast. As shown in FIGS. 3(b) and (c), when the timing sleeve 20 is moving upwardly (a pre-stroke is high), the control group 16 is not closed until the plunger 12 is moved up to a high position, and then an injection time is delayed. A difference in the injection timing becomes an amount of the advanced angle in the fuel injection time.

In FIGS. 4 to 7, a control map stored in the control device 4 is shown.

Figure 4:
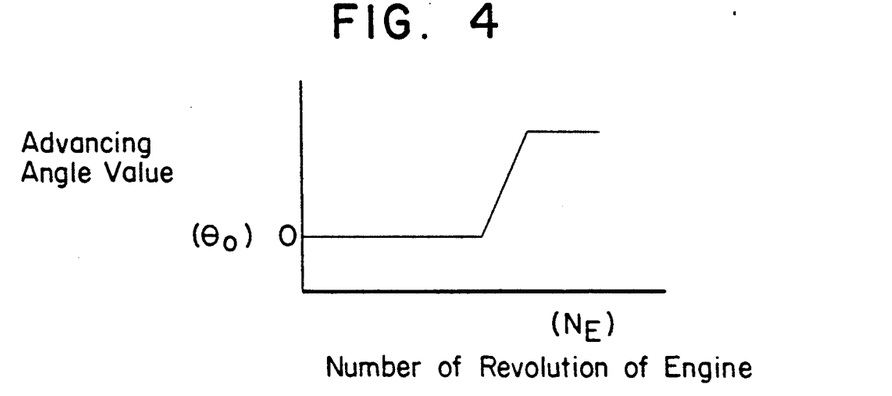
FIGS. 4 to 7 illustrate control maps inputted in a control device.

As shown in FIG. 4 an advancing angle $\theta_o$ of a reference value is set in response to the number of revolutions $N_E$ of the engine 1 (a map 1).

That is, when the number of revolutions $N_E$ is high, the value of the advancing angle is set high. Then the fuel injection is started at a time earlier than at a low speed.

Figure 5:
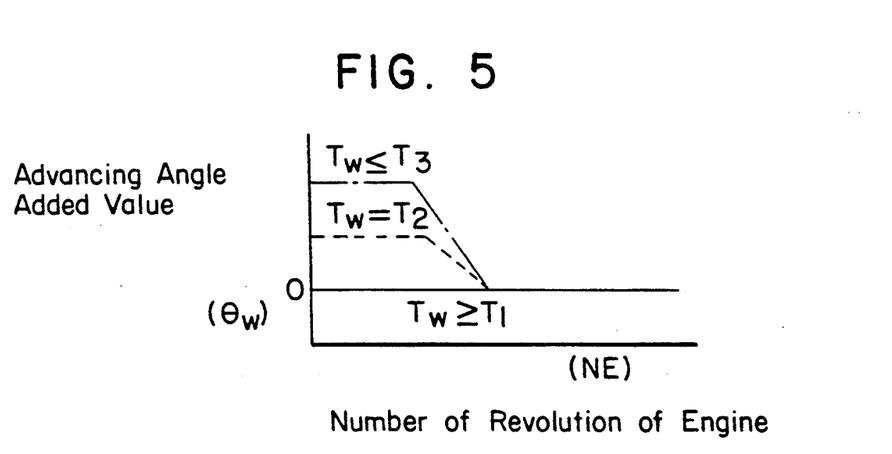

As shown in FIG. 5, an advancing added angle $\theta_w$, added to the reference advancing angle value $\theta_o$, is set in response to the value of a cooling water temperature $T_w$ for the number of revolutions $N_E$ of the engine 1 (a map 2). The cooling water temperature $T_w$ is compared with three predetermined values of $T_1$, $T_2$, and $T_3$ ($T_3 < T_2 < T_1$) and evaluated.

That is, when the cooling water temperature $T_w$ is more than the first predetermined set water temperature $T_1$, (but less than a second predetermined set water temperature $T_2$) the advancing added angle is set to 0; and when the cooling water temperature $T_w$ is equal to the second predetermined set water temperature $T_2$, the advancing added angle value is increased; and in turn when the cooling water temperature $T_w$ is less than or equal to the third predetermined set water temperature $T_3$ and greater than the second predetermined set water temperature $T_2$, the advancing added angle value is at the highest value.

Figure 6:
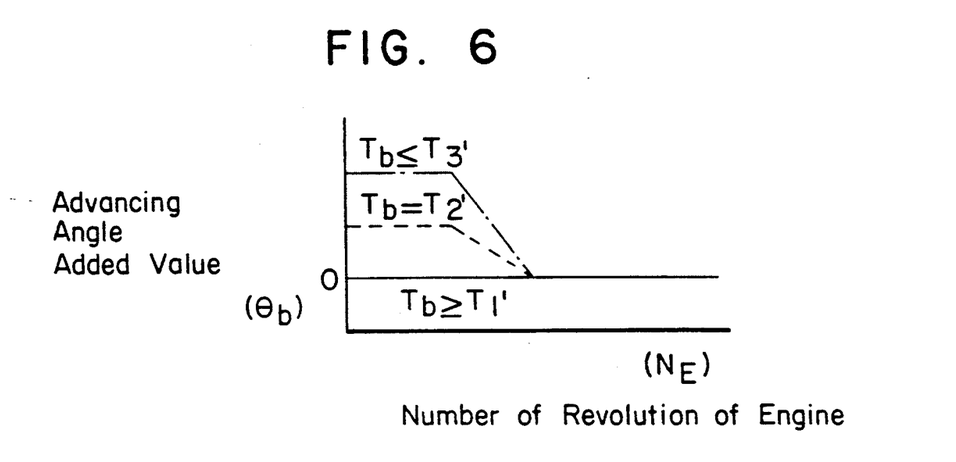

As shown in FIG. 6, an advancing added angle value $\theta_b$ to be added to a reference advancing angle value $\theta_o$ is set in response to a value of the intake gas temperature $T_b$ corresponding to the number of revolutions $N_E$ of the engine 1 (a map 3). The intake gas temperature $T_b$ is compared with three predetermined temperature values $T_1'$, $T_2'$, and $T_3'$ ($T_3' < T_2' < T_1'$) and then evaluated.

That is, when the intake gas temperature $T_b$ is more than the first predetermined set intake gas temperature $T_1'$, (but less than the second predetermined set intake gas temperature $T_2'$) an advancing angle added value is made to be 0; when the intake gas temperature $T_b$ is equal to the second predetermined set intake gas temperature $T_2'$, the advancing angle added value is made large; and when the intake gas temperature $T_b$ is more then the first predetermined set intake gas temperature $T_1'$ and more than the second predetermined set intake gas temperature, the advancing angle added value is an interpolated value proportionally distributed in response to the intake gas temperature.

Figure 7:
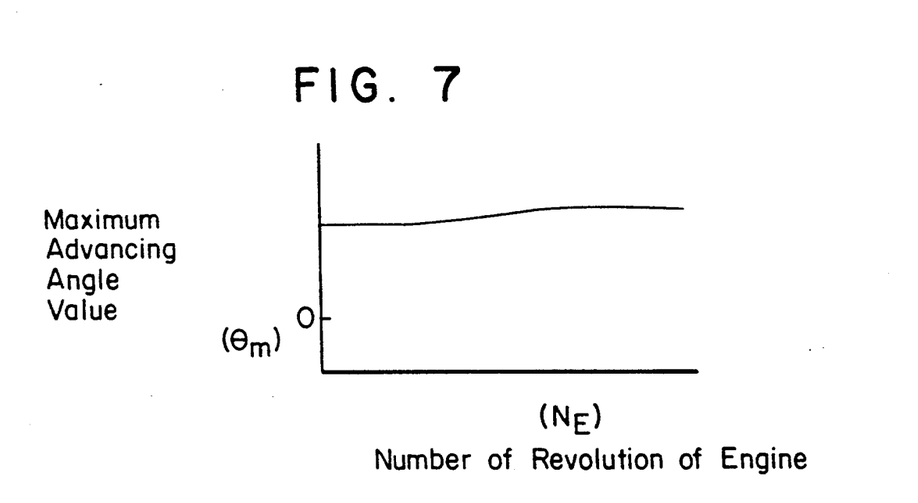

As shown in FIG. 7, the maximum value $\theta_m$ of the advancing angle is set in response to the number of revolutions of the engine 1 and then the upper limit value of the advancing angle value is set (a map 4).

That is, the maximum advancing angle value is slightly higher at a high number of rotation engine revolutions than that at a low number of engine revolutions.

Figure 8:
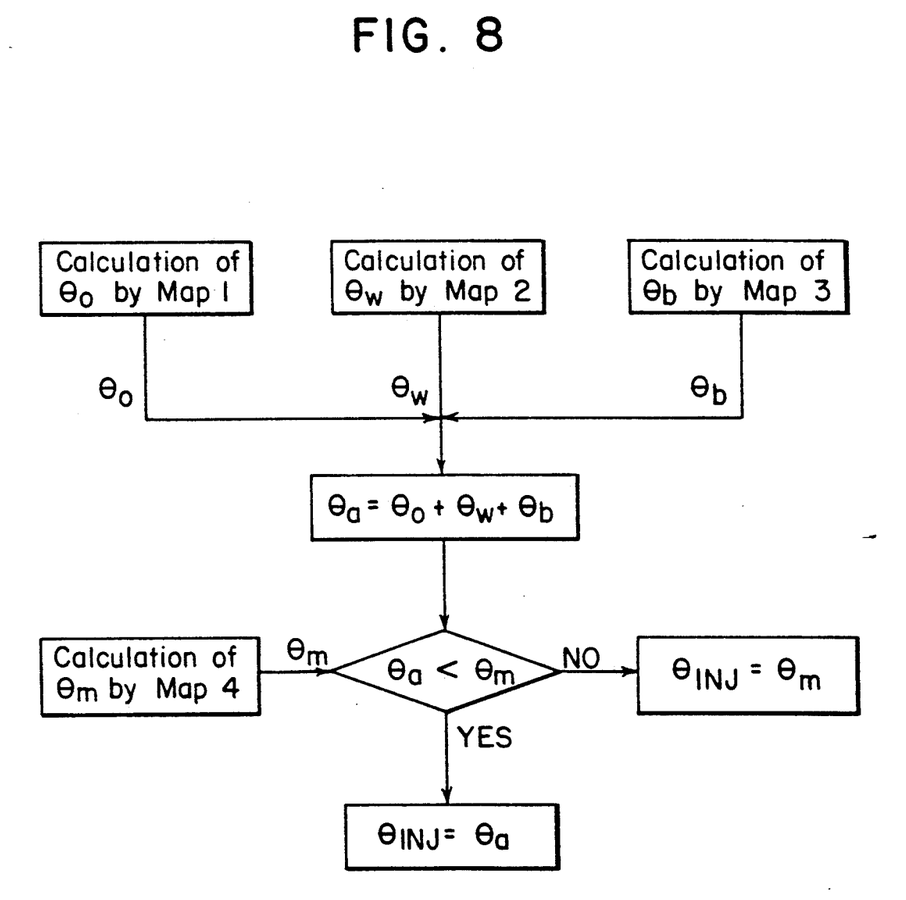
FIG. 8 illustrates an operation flow chart for a fuel injection device.

The action of the fuel injection device described above will be described in reference to the control flow chart shown in FIG. 8.

The number of revolutions $N_E$ of the engine 1 is detected by the number-of-revolution sensor 5, the cooling water temperature $T_a$ is detected by the intake gas temperature sensor 3, and each of the sensed values is inputted to the control device 4.

In the control device 4, the reference advancing angle value $\theta_o$ and the advancing angle added values $\theta_w$, $\theta_b$ are calculated in response to the maps 1, 2 and 3. Further, at the same time, the maximum advancing angle value $\theta_m$ is respect to the number of revolutions $N_E$ is calculated in response to the map 4.

The advancing added angle values $\theta_w$, $\theta_b$ are added to the reference advancing angle value $\theta_o$ to set an accumulated advancing angle value $\theta_a$, which is compared with the maximum advancing angle value $\theta_m$. As a result of the comparison, in the case where the accumulated advancing angle value $\theta_a$ is higher, the target advancing angle value $\theta_{inj}$ is applied as the accumulated advancing angle value $\theta_a$ so as to demand a fuel forced feeding time to the fuel injection pump 6; and in turn when the maximum advancing angle value $\theta_m$ is higher, the target advancing angle value $\theta_{inj}$ is applied as the maximum advancing angle value $\theta_m$ and then an instruction of the fuel forced feeding time is fed to the fuel injection pump 6.

As the target advancing angle value $\theta_{inj}$ is instructed to the fuel injection pump 6, the timing sleeve 20 is moved up and down in response to the instruction value and the injection starting time is varied.

Accordingly, the injection starting time is varied in response to the cooling water temperature Tw and the intake gas temperature Ta. This results in that, when the temperature is low, it is possible to make the injection starting time fast, within the range of the maximum advancing angle value $\theta_m$. Since the cooling water temperature Tw and the intake gas temperature Ta are evaluated in reference to the three predetermined values of temperatures $T_1$, $T_2$, $T_3$, $T_1'$, $T_2'$ and $T_3'$, a changing-over from a control under a low water temperature or a low intake gas temperature, to a normal control, is not performed rapidly. Thus, no trouble occurs in the drivability of the vehicle. Further, the upper limit value of advancing angle is defined by the maximum advancing angle value $\theta_m$, and injection starting time is not made fast.

As described above, the fuel injection device of the present embodiment shows a variable injection time for the fuel in compliance with a temperature state of the engine due to the fact that the injection starting time is varied is response to the cooling water temperature and the intake gas temperature. Further, even if the operation is started from a state in which the engine is kept at a low temperature, the fuel injection starting time can be made fast and an occurrence of the unburned fuel can be prevented.

Further, since the upper limit of the advancing angle value is defined, there is no possibility that the fuel injection starting time is made too fast and the operation is troubled.

From the above-described embodiments of the present invention, it is apparent that the present invention may be modified as would occur to one of ordinary skill in the art without departing from the scope of the present invention which should be defined solely from the apprehended claims. Changes and modifications of the device contemplated by the present preferred embodiments will be apparent to one of ordinary skill in the art.

What is claimed is:

1. A fuel injection device comprising:
    a plunger, operatively connected to a cam, driven by an engine and having control groups for use in communicating with an outer circumferential surface and an end surface of a fuel injection nozzle;
    a timing sleeve, fitted outwardly of the plunger, for opening or closing the control groups;
    an actuator for driving a timing rod connected to the timing sleeve in such a way as to move the timing sleeve up and down against the plunger; and
    a control device for outputting a timing control signal, for controlling the moving-up or moving-down of the timing sleeve, to the actuator in response to operation control signals from a source of operation information, wherein the timing sleeve is moved up and down in response to said timing control signal based on said operation control signal from the source of operating information so as to carry out a control over an advancing angle, said control device including,
    a reference advancing angle value map for setting a reference advancing angle value responsive to a number of revolutions of the engine such that said reference advancing angle value is increased for a higher number of revolutions of the engine,
    water temperature sensing means for sensing a cooling water temperature of the engine,
    an advancing angle water temperature correction map, set in response to the number of revolutions of the engine and the cooling water temperature, wherein a water temperature advancing angle value of said advancing angle water temperature correction map is added to said reference advancing angle value of said reference advancing angle value map, so as to correct said reference advancing angle value, and
    a maximum advancing angle value map including a first maximum advancing angle value range for higher number of revolutions of the engine which is larger than a second maximum advancing angle value range for lower number of revolutions of the engine, said advancing angle failing to exceed said first maximum advancing angle value range at the higher number of revolutions and said second maximum advancing angle value range at the lower number of revolutions.

2. The fuel injection device of claim 1, wherein said actuator comprises a rotary solenoid.

3. The fuel injection device of claim 1, wherein said advancing angle water temperature correction map sets an advancing angle correction value to zero when the cooling water temperature is sensed to be greater than a first predetermined set water temperature, increases said advancing angle correction value large when a low speed by the number of revolutions of the engine is determined and said cooling water temperature is sensed to be greater than the first predetermined set water temperature and less than a second predetermined set water temperature, and interpolately controls said advancing angle correction value when the cooling water temperature is sensed to be greater than the first predetermined set water temperature and greater than the second predetermined set water temperature.

4. The fuel injection device of claim 1, wherein said control device includes intake gas temperature sensing means for sensing an intake gas temperature for sensing an intake gas temperature of the engine, an advancing angle intake gas temperature correction map, set in response to the number of revolutions of the engine and the value of the intake gas temperature, for adding an intake gas temperature advancing angle value of said advancing angle intake gas temperature correction map to said reference advancing angle value of said reference advancing angle value map so that said reference advancing angle is corrected.

5. The fuel injection device of claim 4, wherein said advancing angle intake gas temperature correction map sets the advancing angle correction value to zero when the intake gas temperature is greater than a first predetermined set intake gas temperature, increases said advancing angle correction value when a low speed by the number of revolutions of the engine is determined and said intake gas temperature is sensed to be less than a second predetermined set intake gas temperature and greater than the first predetermined set intake gas temperature, and interpolately controls said advancing angle correction value when the intake gas temperature is sensed to be greater than the first predetermined set intake gas temperature and greater than the second predetermined set intake gas temperature.

6. The fuel injection device of claim 1, wherein said control device includes intake gas temperature sensing means for sensing the intake gas temperature of the engine, and an advancing angle intake gas temperature correction map, in response to the number of revolutions of the edge and the intake gas temperature value, for adding an intake gas temperature advancing angle value of said advancing angle intake gas temperature correction map to a sum of the reference advancing angle value of said reference advancing angle value map and said water temperature advancing angle value of the said advancing angle water temperature correction map, so as to interpolately correct said reference advancing angle value.

7. The fuel injection device of claim 6, wherein said advancing angle intake gas temperature correction map sets said advancing angle correction value to zero when the intake gas temperature is greater than a first predetermined set intake gas temperature, increases said advancing angle correction value when a low speed of the number of revolutions of the engine is determined and said intake gas temperature is sensed to be greater than the first predetermined set intake gas temperature and less than the second set intake gas temperature, and interpolately controls said advancing angle correction value when the intake gas temperature is sensed to be greater than the first predetermined set intake gas temperature and greater than the second predetermined set intake gas temperature.

8. The fuel injection device of claim 1, wherein the sum of the reference advancing angle value in said reference advancing angle value map and said intake gas temperature advancing angle value in said advancing angle intake gas temperature correction map fails to exceed said first maximum advancing angle value range at the higher revolutions of the engine and said second maximum advancing angle value range at the lower revolutions of the engine.

9. The fuel injection device of claim 6, wherein a sum of the reference advancing angle value of said reference advancing angle value map, said intake gas temperature advancing angle value of said advancing angle intake gas temperature correction map and said water temperature advancing angle value of said advancing angle water temperature correction map fails to exceed said first maximum advancing angle value range at the higher revolutions of the engine and said second maximum advancing angle value range at the lower revolutions of the engine.

10. The fuel injection device of claim 4, wherein a sum of said reference advancing angle value of said reference advancing angle value map and said intake gas temperature advancing angle value of said advancing angle intake gas temperature correction map fails to exceed said first maximum advancing angle value range at the high speed rotations of the engine and said second maximum advancing angle value range at the low speed rotations of the engine.

11. A fuel injection device for a diesel engine comprising:
- a number of revolution sensors for sensing a number of revolutions of the engine;
- a water temperatures sensor for sensing a cooling water temperature of the engine;
- an intake sensor for sensing an intake gas temperature of the engine;
- a fuel injection pump for forcibly feeding fuel to the engine during a fuel injection time; and
- control means for developing a timing control signal based on the number of revolutions of the engine, said cooling water temperature of the engine which varies said fuel injection time of said fuel injection pump over an advancing angle, said control means comprises a maximum advancing angle value map including a first maximum advancing angle value range for higher number of revolutions of the engine which is larger than a second maximum advancing angle value range for lower number of revolutions of the engine, said advancing angle failing to exceed said first maximum advancing angle value range at the higher number of revolutions and said second maximum advancing angle value range at the lower number of revolutions.

12. The fuel injection device of claim 11, wherein said fuel injection pump comprises:
- a plunger, operatively connected to a cam, drivers by the engine and having control groups for use in communicating with an outer circumferential surface and an end surface of a fuel injection nozzle;
- a timing sleeve, fitted outwardly of said plunger, for opening and closing said control groups; and
- an actuator for driving a timing rod connected to said timing sleeve so that said timing sleeve is moved up and down against said plunger, said timing sleeve moving up or moving down in response to said timing control signal for controlling said advancing angle.

13. The fuel injection device of claim 11, wherein said actuator comprises a rotary solenoid.

14. A fuel injection device of claim 11, wherein said control means comprises:
- a reference advancing angle value map for setting a reference advancing angle value responsive to the number of revolutions of the engine such that said reference advancing angle value is increased for a higher number of revolutions;
- an advancing angle water temperature correction map for setting a water temperature advancing angle value responsive to the number of revolutions of the engine and said cooling water temperature;
- an advancing angle intake gas temperature correction map for setting an intake gas temperature advancing angle value responsive to the number of revolutions of the engine and said intake gas temperature; and
- means for adding said reference advancing angle value, said water temperature advancing angle value and said intake gas temperature advancing angle value so as to interpolately control said advancing angle.

15. The fuel injection device of claim 14, wherein said advancing angle water correction map sets said water temperature advancing angle value to zero when said cooling water temperature is sensed to be greater than a first predetermined set water temperature, increases said water temperature advancing angle value when the number of revolutions of the engine is low and said cooling water temperature is greater than said first predetermined set water temperature and less than a second predetermined set water temperature and interpolately controls said water temperature advancing angle value when said cooling water temperature is greater than said first and second predetermined set water temperatures;

said advancing angle intake gas temperature correction map sets said intake gas temperature advancing angle value to zero when said intake gas temperature is greater than a first predetermined set intake gas temperature, increases said intake gas temperature advancing angle value when the number of revolutions of the engine is low and said intake gas temperature is greater than said first predetermined set intake gas temperature and less than a second predetermined set intake gas temperature and interpolately controls said intake gas temperature advancing angle value when said intake gas temperature is greater than said first and second predetermined set intake gas temperatures.

16. A method of controlling a fuel injection device for a diesel engine, comprising the steps of:
(a) sensing a number of revolutions of the engine;
(b) sensing a cooling water temperature of the engine;
(c) sensing an intake gas temperature of the engine;
(d) calculating a reference advancing angle value based on the number of revolutions of the engine sensed at said step (a) such that said reference advancing angle value is increased for a higher number of revolutions;
(e) calculating a water temperature advancing angle value based on the number of revolutions of the engine and said cooling water temperature;
(f) calculating an intake gas temperature advancing angle value based on the number of revolutions of the engine and said intake gas temperature;

(g) adding said reference advancing angle value, said water temperature advancing angle value and said intake gas temperature advancing angle value to develop an accumulated advancing angle value;

(h) setting a first maximum advancing angle value range for higher number of revolutions of the engine and a second maximum advancing angle value range for lower number of revolutions of the engine, said first maximum advancing angle value range being larger than said second maximum advancing angle value range being larger than said second maximum advancing angle value range;

(i) comparing said accumulated advancing angle value to said first or second maximum advancing angle value ranges depending on the number of revolutions of the engine;

(j) determining an advancing angle to be said accumulated advancing angle value when said accumulated advancing angle value fails to exceed said first or second maximum advancing angle value ranges based on the number of revolutions of the engine and determining said advancing angle to be said first or second maximum advancing angle value range when said accumulated advancing angle value exceeds said first or second maximum advancing angle value range based on the number of revolutions of the engine from the comparison at said step (i); and (k) controlling a fuel injection time of a fuel injection pump for the engine by said advancing angle determined at said step (j).

17. The method of controlling a fuel injection device of claim 16, wherein said step (e) includes the steps of, setting said water temperature advancing angle value to zero when said cooling water temperature is greater than a first predetermined set water temperature, increasing said water temperature advancing angle value when the number of revolutions of the engine is low and said cooling water temperature is greater than said first predetermined set water temperature and less than a second predetermined set water temperature, and interpolately controlling said water temperature advancing angle value when said cooling water temperature is greater than said first and second predetermined set water temperature; and said step (f) includes the steps of, setting said intake gas temperature advancing angle to zero when said intake gas temperature is greater than a first predetermined set intake gas temperature, increasing said intake gas temperature advancing angle value when the number of revolutions of the engine is low and said intake gas temperature is greater than said first predetermined set intake gas temperature and less than a second predetermined set intake gas temperature, and interpolately controlling said intake gas temperature advancing angle value when said intake gas temperature is greater than said first and second predetermined set intake gas temperature.

* * * * *

UNITED STATES PATENT AND TRADEMARK OFFICE
CERTIFICATE OF CORRECTION

PATENT NO. : 5,259,350
DATED : November 9, 1993
INVENTOR(S) : Toru Kawatani, Hiroshi Kamikubo, Katsuyuki Sugawara, Kazutoshi Mori It is certified that error appears in the above-indentified patent and that said Letters Patent is hereby corrected as shown below:

Cover page, at the Heading (75) Inventors:
change "Kawatani Toru" to

--Toru Kawatani-- and

Cover page, at the Heading (19) Toru et al.:
change "Toru et al." to

--Kawatani et al.--

Signed and Sealed this

Twenty-first Day of June, 1994

Attest:

BRUCE LEHMAN

Attesting Officer    Commissioner of Patents and Trademarks